A. C. BOND.
LAWN MOWER.
APPLICATION FILED MAR. 13, 1912.
1,044,735.
Patented Nov. 19, 1912.
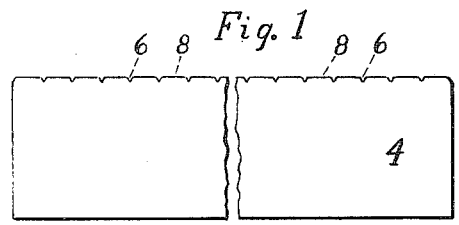
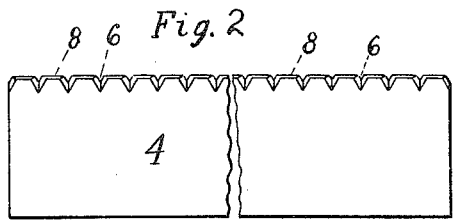
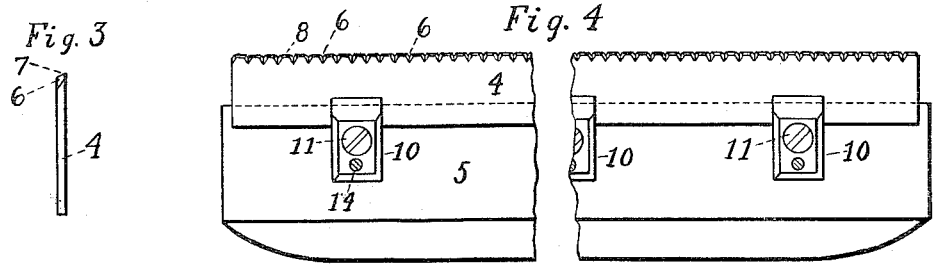
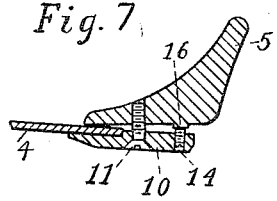
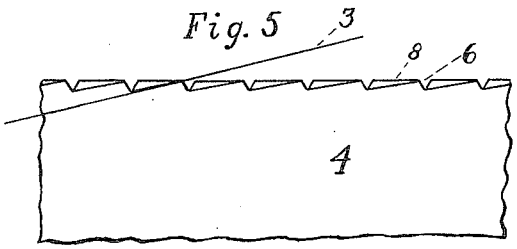
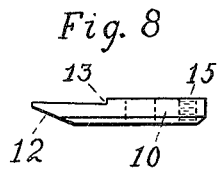
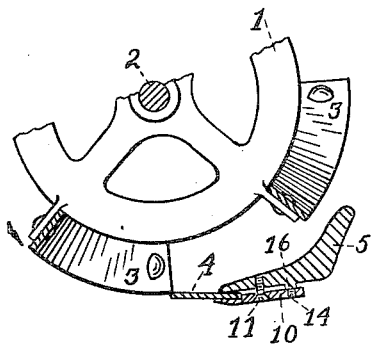
WITNESSES:
L. R. Fessenden.
H. Smith
INVENTOR.
Alfred C. Bond,
BY
ATTORNEY.

UNITED STATES PATENT OFFICE.

ALFRED C. BOND, OF LENOX, MASSACHUSETTS.

LAWN-MOWER.

1,044,735.  Specification of Letters Patent.  Patented Nov. 19, 1912.

Application filed March 13, 1912. Serial No. 683,598.

*To all whom it may concern:*

Be it known that I, ALFRED C. BOND, a subject of the King of Great Britain, residing at Lenox, in the county of Berkshire and State of Massachusetts, in the United States of America, have invented certain new and useful Improvements in Lawn-Mowers, of which the following is a specification.

My present invention relates to lawn mowers and has for its object to improve the cutting mechanism thereof, and, more particularly, the stationary knife, or cutter plate, and its securing means.

The stationary knife which I employ is formed of spring metal and has for its distinctive feature a series of spaced notches distributed along its front edge, the intervening teeth being provided with straight cutting edges in substantial alinement parallel to the axis of the rotary knife.

I am aware that cutter blades have been previously formed of spring metal and that such blades have also been constructed with a serrated front edge. In my prior application, Serial Number 595,349, filed December 3, 1910, in relation to lawn mowers, I have shown a device which combines both of these features, but in all previous known devices of this character which are provided with a serrated stationary blade, the serrations are formed or arranged so as to intercept one another and form a continuous series, the teeth being pointed and the notches cleft relatively well down, as in the manner of the ordinary type of a carpenter's saw. I find this construction objectionable in the present device by reason of the fact that the blades of the rotary knife in passing obliquely along the edge of the stationary blade are continuously in contact with at least two adjacent teeth of the latter, so that there is no release of or change in the tension exerted by one blade upon the other. Moreover, in previous types of stationary blades which are provided with a series of serrations, the oblique edges of the notches which form the sides of the teeth constitute the cutting edges, while in my present device the notches are made relatively smaller and spaced apart so that the cutting edges of the several teeth are in alinement at an angle to the edge of the rotary blade, which fact I regard as an advantage over previous known forms of serrated blades. Further, the notches are so spaced apart that the edge of the rotary knife in wiping the stationary blade takes into each notch separately and before engaging the proximate tooth, thereby causing a partial release of the tension between the blades. As the movement of the rotary blade progresses and upon its coming into contact with the corner of the tooth next succeeding after passing through a given notch, the sudden strong impact of the engaging parts due to a slight variation in level of the blades at the point of contact, gives an increased biting force which is directed upon the intervening blades of grass. Instead, therefore, of the usual uniform tension between the engaged cutting blades and the fixed cutting power of a given propelling force applied to the mower, I provide with the same propelling force a rapid alternation in the application and release of tension between the knives and thus obtain a greater cutting efficiency through a series of short strokes of higher initial power. The action of a pair of ordinary hand shears in cutting a piece of cloth is suggested as illustrative of the operation of my device, although not wholly parallel. In the latter instance the operator commonly finds that a series of short strokes of the opposing blades upon the work where the incisive force is rapidly released and renewed and the relative positions of the blades at initial engagement forms a sharper angle, is more effectual than one continuous stroke, if the work offers sensible resistance.

For the purpose of increasing or reducing the tension between the engaging blades at a given point, I further provide auxiliary means in the clamping devices for securing the stationary blade on the carrier, as will be hereinafter more fully set forth.

Having described the general character, purpose and operation of my invention, I will proceed to describe a specific useful form of embodiment thereof, wherein—

Figure 1 is a top view of my stationary cutting blade; Fig. 2, a bottom view of the same; Fig. 3, an end view of the same; Fig. 4 a sectional bottom view of the stationary blade as mounted on the carrier, showing the relation of the clamps thereon; Fig. 5, a detail sectional view of the cutting edge of the stationary blade and indicating the relative position of the rotary knife, the effects of wear upon the several teeth by the engagement of these parts being also illustrated; Fig. 6, a transverse sectional view of the assembled cutting mechanism employed in an ordinary form of lawn mower, wherein a preferred form of my invention is embodied; Fig. 7, a cross-section of the carrier with the parts of my invention mounted thereon, and showing the relative position of the blade on the carrier when the tension exerted by the stationary blade upon the rotary blade has been increased by the adjustment of the set-screw in the clamp; and Fig. 8, an edge or side view in detail of the body of the clamp.

The rotary cutter or reel 1, mounted upon a shaft 2, is shown as provided with a plurality of spirally arranged blades 3, 3, etc., the front edges of which are preferably beveled and adapted to successively barely engage the stationary blade or plate 4, which is removably secured on a horizontal support or carrier 5 and positioned in the path of the blades 3, 3, adjacent the surface of the ground, whereby the blades of grass are severed as the mower travels forward. The carrier 5 is supposed to be supported at its ends in adjustable relation on the frame of the mower (not shown), the carrier being adjusted vertically for truing the position of the plate 4 with relation to the rotary blades 3, 3, etc.

The stationary blade 4 is preferably made uniformly thin and constructed of spring metal with sufficient resiliency to yield somewhat to the pressure of the rotary knives, resuming its normal position upon the release of such pressure. The blade 4 is provided with a series of beveled notches 6, 6, etc., formed on the underside of the front edge and extending slightly through on the upper side of the blade, the extreme edge of the blade being also slightly beveled on its underside, as shown at 7, Fig. 3. Said notches 6, 6, are distributed along the blade at substantially uniform distances apart, providing in effect a series of flat-headed teeth 8, 8, etc., which present a straight cutting edge parallel to the axis of the rotary knife. The sizes and proportions of the several teeth and notches respectively are such that the line of the rotary blade traveling at an angle over the blade 4, as shown in Fig. 5, falls slightly as its enters the notch and again rises when clearing. The rotary blade, after entering one of the notches 6, is brought into abrupt engagement with the adjacent end of the proximate tooth, which in forcing the rotary blade slightly upward again to its normal position on the front edge of the tooth, causes an increase of tension between the engaging blades which effectually severs the intervening blades of grass. The resulting impact of the blades succeeding each notch in the stationary blade produces a biting effect with superior cutting powers upon the grass, which forms the object of my invention.

The stationary blade 4 is shown as secured on the carrier 5 by means of a plurality of individual clamps 10, 10, distributed along the carrier and secured thereto by means of screws 11, 11 etc., projecting through a transverse opening through the body of the clamp. The front end of the clamp 10 is constructed with a lip 12, inclined slightly upward on its inner face, which projects upon the lower side of the stationary blade forward to a point somewhat beyond the edge of the carrier, as shown in Fig. 4. The body of the clamp forms a shoulder at 13, over the rear end of the lip 12, which prevents rearward displacement of the blade. To regulate the tension or pressure of the clamp upon the blade 4 at a given point I provide a set-screw 14 seated in a tapped opening 15 provided in the rear of the screw 11 and extending through the body of the clamp, said screw 14 being disposed preferably over a slight ledge or shoulder 16 normally provided on the carrier and adapted to engage therewith. To increase the tension between the engaging blades 3 and 4 at a given point, the screw 10 in the clamp nearest the point desired is slightly loosened while the set-screw 14 is then screwed down below the clamp thereby slightly raising the rear end and affording sufficient thrust to cause the front end of the clamp to bear upward upon the blade 4 with increased pressure.

I claim:—

1. In lawn mowers having a rotary blade, a stationary blade of resilient metal having a cutting edge provided with a series of teeth having three sides each, one of such sides being substantially parallel to the axis of the rotary blade and forming the main cutting portion of the edge of the stationary blade.

2. In lawn mowers having a rotary blade, a stationary blade of thin resilient metal having its front side provided with a series of slight notches spaced apart relatively to each other, each of the teeth formed by the intervening notches being constructed to form a three-sided element, one of the sides of each tooth being in alinement with the corresponding sides of the remaining teeth and constituting therewith a cutting edge substantially parallel to the axis of the rotary blade.

In testimony whereof I hereunto affix my signature in presence of two witnesses.

ALFRED C. BOND.

Witnesses:
 JNO. J. WHITTLESEY,
 MICHAEL L. EISNER.